United States Patent
Chin et al.

(10) Patent No.: US 8,861,384 B2
(45) Date of Patent: Oct. 14, 2014

(54) CONTROL CHANNEL DISCONTINUOUS RECEPTION (DRX) MESSAGING FOR PERFORMING MEASUREMENTS TO ENABLE HANDOVER BETWEEN WIRELESS NETWORKS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 12/884,646

(22) Filed: Sep. 17, 2010

(65) Prior Publication Data

US 2011/0280141 A1 Nov. 17, 2011

Related U.S. Application Data

(60) Provisional application No. 61/345,242, filed on May 17, 2010.

(51) Int. Cl.
  *H04W 52/02* (2009.01)
  *H04W 36/00* (2009.01)
  *H04W 76/04* (2009.01)
  *H04W 36/30* (2009.01)

(52) U.S. Cl.
  CPC ........ *H04W 36/0088* (2013.01); *H04W 76/048* (2013.01); *H04W 36/30* (2013.01)
  USPC ........... 370/252; 370/311; 370/335; 370/342; 455/67.11; 455/574

(58) Field of Classification Search
  None
  See application file for complete search history.

(56) References Cited

U.S. PATENT DOCUMENTS

| | | | |
|---|---|---|---|
| 7,254,411 B2 * | 8/2007 | Cheng et al. | 455/466 |
| 2004/0174850 A1 * | 9/2004 | Vimpari et al. | 370/335 |

(Continued)

FOREIGN PATENT DOCUMENTS

| | | |
|---|---|---|
| CN | 1623347 A | 6/2005 |
| WO | WO2008052201 | 5/2008 |

(Continued)

OTHER PUBLICATIONS

"3rd Generation Partnership Project; Technical Specification Group Radio Access Network; High Speed Downlink Packet Access (HSDPA); Overall description; Stage 2 (Release 10)", 3GPP Standard; 3GPP TS 25.308, 3rd Generation Partnership Project (3GPP), Mobile Competence Centre; 650, Route Des Lucioles ; F-06921 Sophia-Antipolis Cedex; France, No. V10.0.0, Apr. 27, 2010, pp. 1-66, XP05044144.

(Continued)

*Primary Examiner* — Chi Pham
*Assistant Examiner* — Shick Hom
(74) *Attorney, Agent, or Firm* — Kristine U. Ekwueme (57) ABSTRACT

In geographical areas with incomplete coverage of Time Division Synchronous Code Division Multiple Access (TD-SCDMA) networks, it may be beneficial for a multimode User Equipment (UE) to handover to a Global System for Mobile Communications (GSM) network. Before handover, a multimode UE may receive an indication from a serving TD-SCDMA cell to enter a Discontinuous Reception (DRX) mode and perform measurement on a nearby GSM cell. After measurement, the UE receives a grant from the serving TD-SCDMA cell allowing the UE to transmit a measurement report to the serving TD-SCDMA cell. The TD-SCDMA cell may use the measurement report to determine if the multimode UE should handover to the GSM cell.

44 Claims, 9 Drawing Sheets

(56) References Cited

U.S. PATENT DOCUMENTS

| | | | |
|---|---|---|---|
| 2005/0227732 A1* | 10/2005 | Hiraki | 455/561 |
| 2006/0126577 A1* | 6/2006 | Yano et al. | 370/337 |
| 2007/0111751 A1* | 5/2007 | Iimori | 455/550.1 |
| 2009/0196197 A1 | 8/2009 | Digirolamo et al. | |
| 2010/0279715 A1* | 11/2010 | Alanara et al. | 455/458 |
| 2010/0297955 A1* | 11/2010 | Marinier et al. | 455/73 |
| 2011/0130100 A1* | 6/2011 | Chen et al. | 455/67.11 |

FOREIGN PATENT DOCUMENTS

| | | |
|---|---|---|
| WO | 2008155739 A2 | 12/2008 |
| WO | 2009068592 A1 | 6/2009 |

OTHER PUBLICATIONS

"3rd Generation Partnership Project; Technical Specification Group Radio Access Network; Physical layer procedures (TDD) (Release 9)", 3GPP Standard; 3GPP TS 25.224, 3rd Generation Partnership Project (3GPP), Mobile Competence Centre; 650, Route Des Lucioles ; F-06921 Sophia-Antipolis Cedex; France, No. V9.1.0, Mar. 20, 2010, pp. 1-83, XP05040196.

China Unicom et al: "Consideration on HS-SCCH orders for activation and deactivation of DRX and DTX operation for DC-HSDPA" 3GPP Draft; R1-093277 Consideration on HS-SCCH Orders for Activation and, 3rd.

Generation Partnership Project (3GPP), Mobile Competence Centre ; 650, Route Des Lucioles ; F-06921 Sophia-Antipolis Cedex; France, No. Shenzhen, China; 20090819, Aug. 19, 2009, XP050351603.

Interdigital Communication et al: "Further Considerations for 4-carrier HSDPA DRX Design", 3GPP Draft; R1-103370, 3rd Generation Partnership Project (3GPP), Mobile Competence Centre; 650, Route Des Lucioles; F-06921 Sophia-Antipolis Cedex; France, vol. RAN WG1, No. Montreal, Canada; 20100510, May 15, 2010, XP050420447.

International Search Report and Written Opinion—PCT/US2011/036883—ISA/EPO—Sep. 30, 2011.

* cited by examiner

CONTROL CHANNEL DISCONTINUOUS RECEPTION (DRX) MESSAGING FOR PERFORMING MEASUREMENTS TO ENABLE HANDOVER BETWEEN WIRELESS NETWORKS

CROSS REFERENCE TO RELATED APPLICATION

This application claims the benefit of U.S. provisional patent application no. 61/345,242 filed May 17, 2010, in the names of CHIN et al., the disclosure of which is expressly incorporated by reference in its entirety.

BACKGROUND

1. Field

Aspects of the present disclosure relate, in general, to wireless communication systems, and more particularly, to facilitating handover between a Time Division-Synchronous Code Division Multiple Access (TD-SCDMA) network and a GSM network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure, a method for communicating in a wireless network includes receiving an indication from a Node B (NB) of a first radio access network to enter an idle interval and to measure a signal quality in a second radio access network. The method also includes measuring, during the idle interval, the signal quality in the second radio access network.

In another aspect, a computer program product for communicating in a wireless network includes a computer-readable medium having code to receive an indication from a Node B (NB) of a first radio access network to enter an idle interval and to measure a signal quality in a second radio access network. The medium also includes code to measure, during the idle interval, the signal quality in the second radio access network.

In yet another aspect, an apparatus for communicating in a wireless network includes a processor and a memory coupled to the processor. The processor is configured to receive an indication from a Node B (NB) of a first radio access network to enter an idle interval and to measure a signal quality in a second radio access network. The processor is also configured to measure, during the idle interval, the signal quality in the second radio access network.

In a further aspect, an apparatus for communicating in a wireless network includes means for receiving an indication from a Node B (NB) of a first radio access network to enter an idle interval and to measure a signal quality in a second radio access network. The apparatus also includes means for measuring, during the idle interval, the signal quality in the second radio access network.

In another aspect, a method for communicating in a wireless network includes receiving a discontinuous reception (DRX) over a High Speed Shared Control Channel (HS-SCCH) of the wireless network. The method also includes entering an idle period during which no reception occurs from the wireless network.

In yet another aspect, a computer program product for communicating in a wireless network includes a computer-readable medium having code to receive a discontinuous reception (DRX) over a High Speed Shared Control Channel (HS-SCCH) of the wireless network. The medium also includes code to enter an idle period during which no reception occurs from the wireless network.

In a further aspect, an apparatus for communicating in a wireless network includes a processor and a memory coupled to the processor. The processor is configured to receive a discontinuous reception (DRX) over a High Speed Shared Control Channel (HS-SCCH) of the wireless network. The processor is further configured to enter an idle period during which no reception occurs from the wireless network.

In another aspect, an apparatus for communicating in a wireless network includes means for receiving a discontinuous reception (DRX) over a High Speed Shared Control Channel (HS-SCCH) of the wireless network. The apparatus also includes means for entering an idle period during which no reception occurs from the wireless network.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
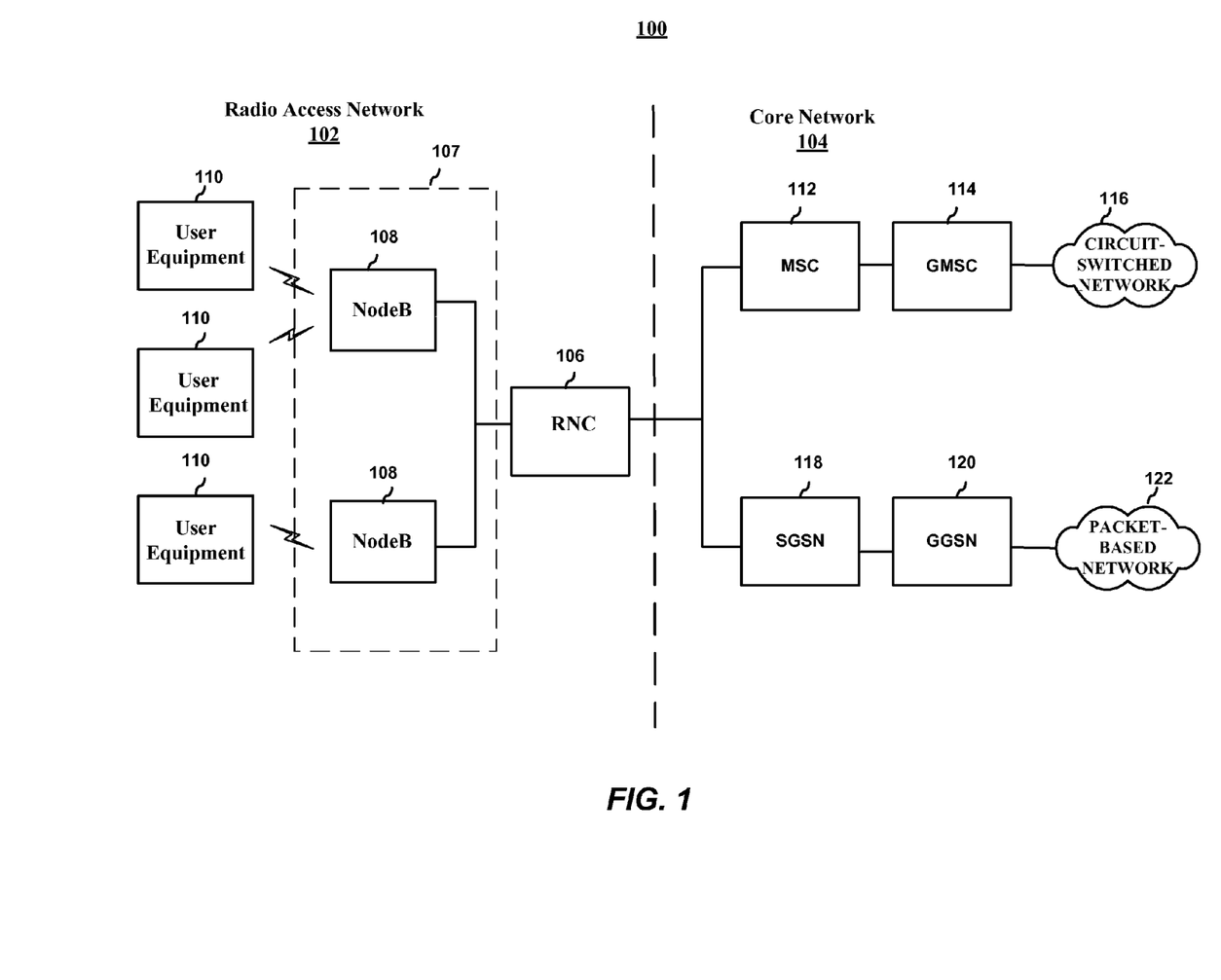
FIG. 1 is a block diagram illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (Radio Access Network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a Base Station (BS), a Base Transceiver Station (BTS), a radio base station, a radio transceiver, a transceiver function, a Basic Service Set (BSS), an Extended Service Set (ESS), an Access Point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a Session Initiation Protocol (SIP) phone, a laptop, a notebook, a netbook, a smartbook, a Personal Digital Assistant (PDA), a satellite radio, a Global Positioning System (GPS) device, a multimedia device, a video device, a digital audio player (e.g., MP3 player), a camera, a game console, or any other similar functioning device. The mobile apparatus is commonly referred to as User Equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an Access Terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The Downlink (DL), also called the forward link, refers to the communication link from a Node B to a UE, and the Uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a Visitor Location Register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a Home Location Register (HLR) (not shown) containing subscriber data, such as the data reflecting the details of the services to which a particular user has subscribed. The HLR is also associated with an Authentication Center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a Serving GPRS Support Node (SGSN) 118 and a Gateway GPRS Support Node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a Time Division Duplexing (TDD), rather than a Frequency Division Duplexing (FDD) as used in many FDD mode UMTS/W-CDMA systems. TDD uses the same carrier frequency for both the Uplink (UL) and Downlink (DL) between a Node B 108 and a UE 110, but divides uplink and downlink transmissions into different time slots in the carrier.

Figure 2:
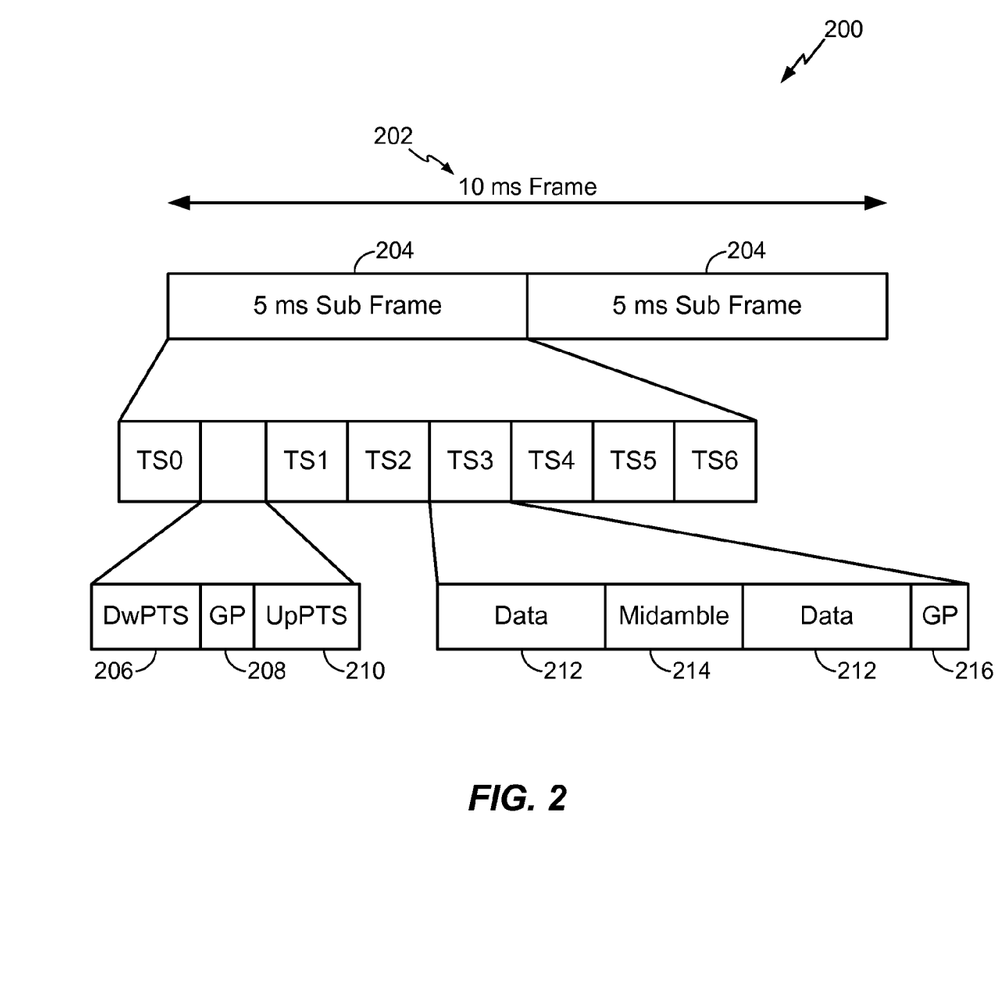
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A Downlink Pilot Time Slot (DwPTS) 206 (also known as the Downlink Pilot Channel (DwPCH)), a guard period (GP) 208, and an Uplink Pilot Time Slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a Guard Period (GP) 216. The midamble 214 may be used for features, such as channel estimation, while the GP 216 may be used to avoid inter-burst interference.

Figure 3:
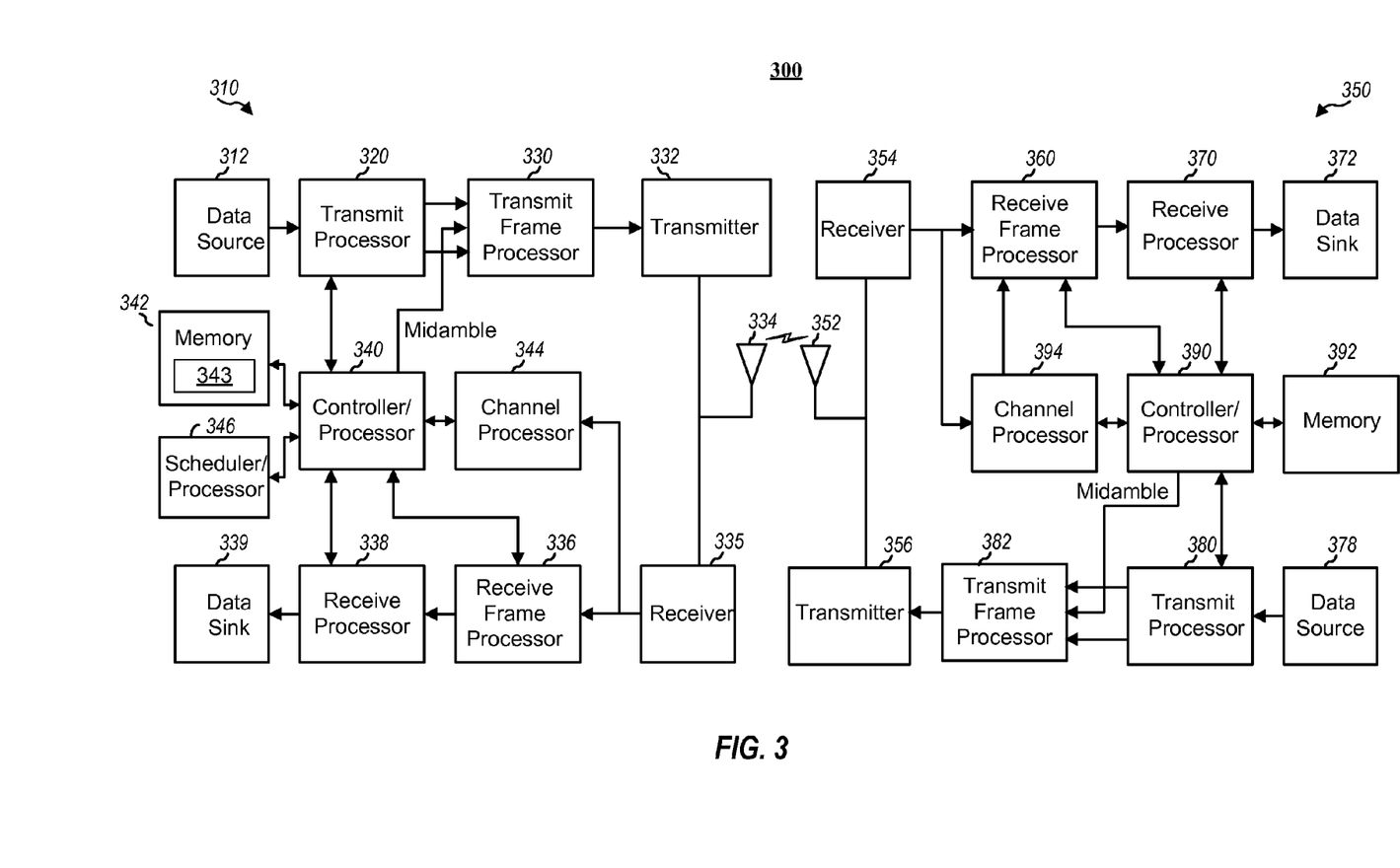
FIG. 3 is a block diagram of a Node B in communication with a user equipment in a radio access network.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide Cyclic Redundancy Check (CRC) codes for error detection, coding and interleaving to facilitate Forward Error Correction (FEC), mapping to signal constellations based on various modulation schemes (e.g., Binary Phase-Shift Keying (BPSK), Quadrature Phase-Shift Keying (QPSK), M-Phase-Shift Keying (M-PSK), M-Quadrature Amplitude Modulation (M-QAM), and the like), spreading with Orthogonal Variable Spreading Factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an Acknowledgement (ACK) and/or Negative Acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an Acknowledgement (ACK) and/or Negative Acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. For example, the memory 342 of the Node B 310 includes a handover module 343, which, when executed by the controller/processor 340, the handover module 343 configures the Node B to perform handover procedures from the aspect of scheduling and transmission of system messages to the UE 350 for implementing a handover from a source cell to a target cell. A scheduler/processor 346 at the Node B 310 may be used to allocate resources to the UEs and schedule downlink and/or uplink transmissions for the UEs not only for handovers, but for regular communications as well.

In order to provide more capacity, the TD-SCDMA system may allow multiple carrier signals or frequencies. Assuming that N is the total number of carriers, the carrier frequencies may be represented by the set $\{F(i), i=0, 1, \ldots, N-1\}$, where the carrier frequency, $F(0)$, is the primary carrier frequency and the rest are secondary carrier frequencies. For example, a cell can have three carrier signals whereby the data can be transmitted on some code channels of a time slot on one of the three carrier signal frequencies.

Figure 4:
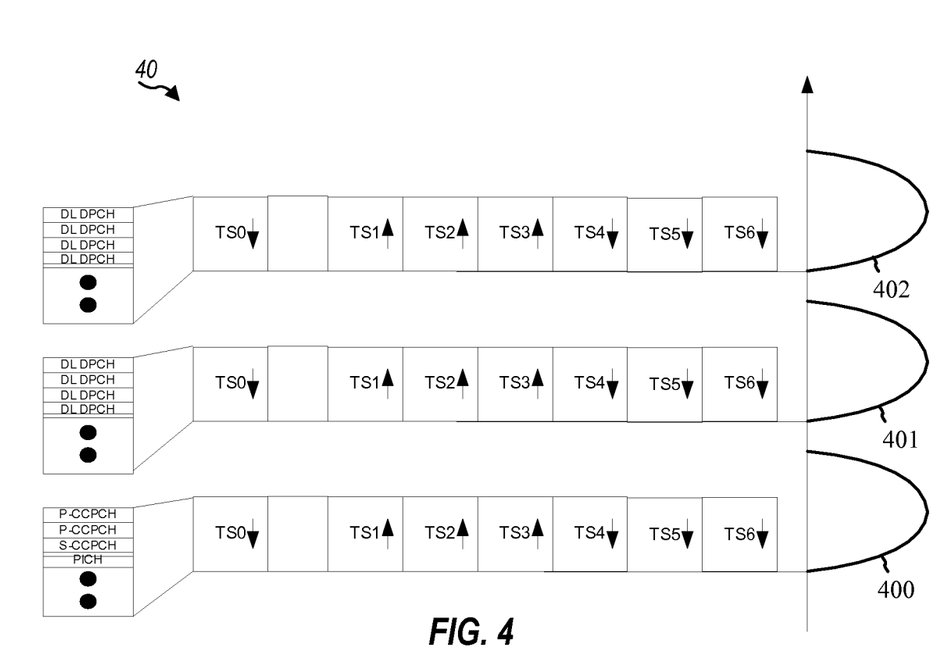
FIG. 4 is a block diagram illustrating carrier frequencies in a multi-carrier TD-SCDMA communication system.

FIG. 4 is a block diagram illustrating carrier frequencies 40 in a multi-carrier TD-SCDMA communication system. The multiple carrier frequencies include a primary carrier frequency 400 ($F(0)$), and two secondary carrier frequencies 401 and 402 ($F(1)$ and $F(2)$). In such multi-carrier systems, the system overhead may be transmitted on the first time slot (TS0) of the primary carrier frequency 400, including the Primary Common Control Physical Channel (P-CCPCH), the Secondary Common Control Physical Channel (S-CCPCH), the Paging Indicator Channel (PICH), and the like. The traffic channels may then be carried on the remaining time slots (TS1-TS6) of the primary carrier frequency 400 and on the secondary carrier frequencies 401 and 402. Therefore, in such configurations, a UE will receive system information and monitor the paging messages on the primary carrier frequency 400 while transmitting and receiving data on either one or all of the primary carrier frequency 400 and the secondary carrier frequencies 401 and 402.

Deployment of a TD-SCDMA network may not provide complete geographic coverage in certain areas. In areas where TD-SCDMA networks are deployed, GSM networks may have a large geographical presence. Thus, UEs may benefit from being able to handover from TD-SCDMA cells to GSM cells. For example, if a serving cell and a neighboring cell of a TD-SCDMA network provide poor signal strength for a UE, the UE may be instructed to handover to a GSM cell having better signal strength. Before handover from a TD-SCDMA cell to a GSM cell, the UE should measure nearby GSM cells to allow the serving TD-SCDMA cell to determine if handover is appropriate. Additionally, other situations may arise that would benefit from allowing a UE communicating with a first radio access network to make measurements on a second radio access network.

3rd Generation Partnership Project (3GPP) Release 8 supports Control Channel Discontinuous Reception (DRX) for high speed downlink packet access (HSDPA) and high speed uplink packet access (HSUPA) operations. Control Channel DRX may be enabled on the UE by the UE receiving Radio Resource Control (RRC) messages such as physical channel reconfiguration, radio bearer reconfiguration, radio bearer release, radio bearer setup, and/or transport channel reconfiguration. Control Channel DRX may be disabled on the UE by the UE receiving a command to deactivate Control Channel DRX on the High-Speed Shared Control Channel (HS-SCCH). After Control Channel DRX is disabled on the UE, the UE may resume normal continuous data transmission on the TD-SCDMA network.

In Control Channel DRX for HSDPA and HSUPA operation, a User Equipment (UE) monitors physical channels only during certain periods. A period for the UE to monitor the High-Speed Shared Control Channel (HS-SCCH) is defined by a HS-SCCH DRX Cycle (1, 2, 4, 8, 16, 32, or 64 subframes) and a HS-SCCH DRX Offset (between 0 and 63 subframes). The High-Speed Shared Control Channel (HS-SCCH) is monitored to indicate a Modulation and Coding Scheme (MCS) as well as a channelization code and timeslot (TS) resource information for a data burst in the High-Speed Physical Downlink Shared Channel (HS-PDSCH).

The UE also monitors an Enhanced Dedicated Channel (E-DCH) Absolute Grant Channel (E-AGCH) on the downlink TSs to indicate the uplink absolute grant control information. A period for the UE to monitor the E-AGCH is defined by an E-AGCH Cycle (1, 2, 4, 8, 16, 32, 64 subframes) and an E-AGCH DRX Offset (between 0 and 63 subframes).

Figure 5:
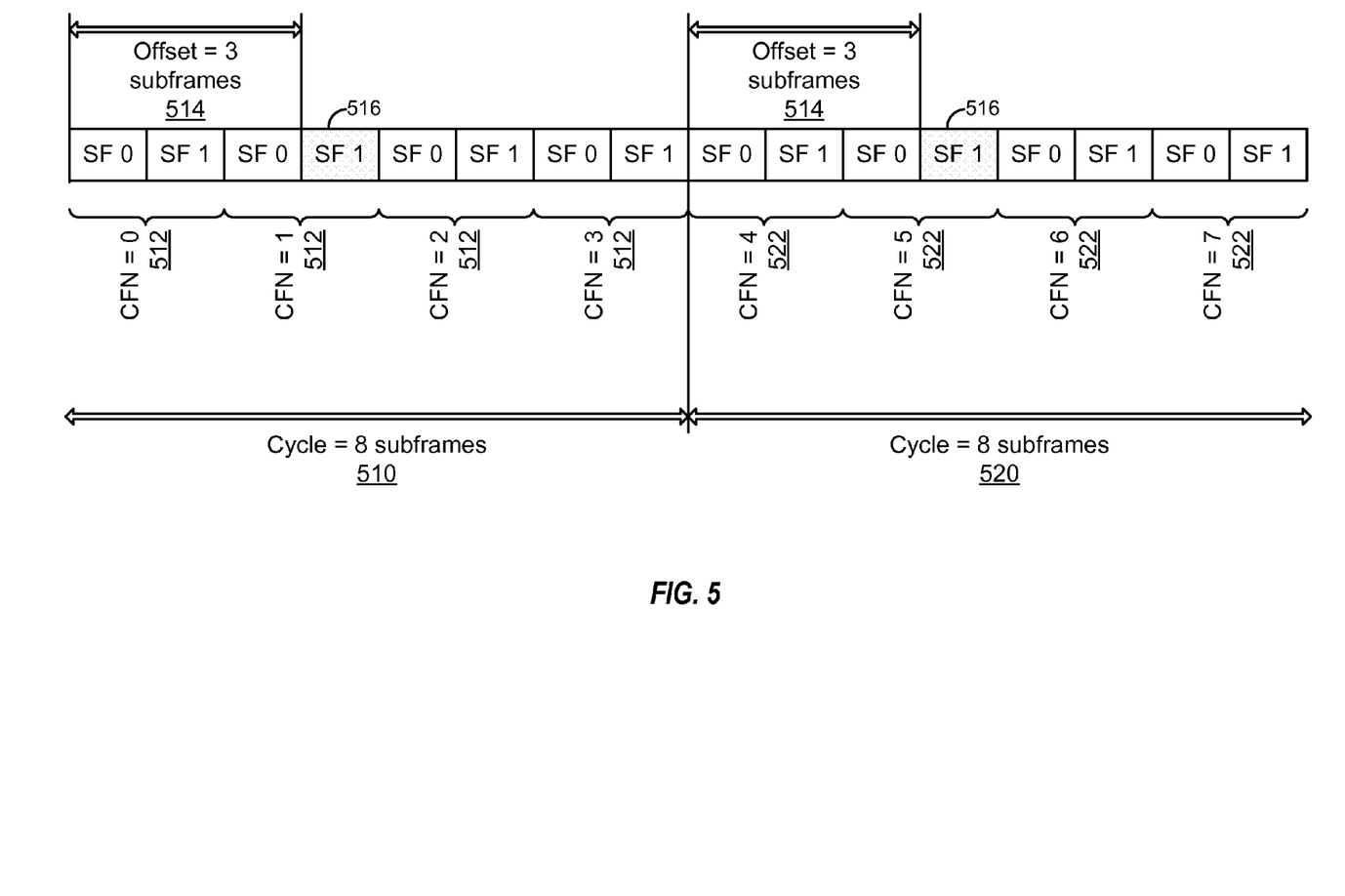
FIG. 5 is a block diagram illustrating an exemplary timing for monitoring physical channels according to one aspect.

FIG. 5 shows an exemplary timing for monitoring physical channels in accordance with a Control Channel DRX. In this example, the E-AGCH DRX Cycle and the HS-SCCH DRX Cycle are both eight subframes. That is, a first cycle 510 having eight subframes is followed by a second cycle 520 having eight subframes. Although only two cycles are shown, the subframe arrangement shown for the cycles 510, 520 may continue for many more cycles. Each cycle 510, 520 is divided into four connection frame numbers (CFNs) 512, 522. Each connection frame number 512, 522 includes two subframes, SF0 and SF1. In this example, the HS-SCCH DRX Offset and the E-AGCH DRX Offset are both three subframes. Thus, in each cycle after an offset 514 of three subframes, the UE monitors at subframe 516 the physical channels, HS-SCCH and E-AGCH.

In FIG. 5, the HS-SCCH and E-AGCH monitoring occur in connection frame number 1, subframe 1 of each cycle. That is, physical channel monitoring occurs in the fourth subframe 516 of each eight subframe cycle 510, 520, i.e., after the three frame offset 514. If there is no activity (i.e., no allocation on the HS-SCCH for the UE) a certain number of subframes (e.g., Inactivity_Threshold_for_HS-SCCH_DRX_cycle subframes) after transmitting, for example, a Hybrid Automatic Repeat Request (HARQ) Acknowledgement/Negative Acknowledgement (ACK/NACK) on the High-Speed Shared Information Channel (HS-SICH), then the UE may start HSDPA DRX and may power down until the next cycle. At the offset 514 in the next cycle 520, the UE will power up, and then monitor again in that next cycle 520 at the fourth subframe 516. If there is no activity (e.g., no allocation on the E-AGCH for the UE a predetermined number of subframes (e.g., E-AGCH_Inactivity_Monitor_Threshold_subframes)) after receiving a HARQ ACK/NACK on the Enhanced DCH Hybrid ARQ Acknowledgement Indicator Channel (E-HICH) for the Node B, then the UE may start HSUPA DRX and for example power down until the next offset 514. At the next offset 514, the UE will power up, and then monitor again in that next cycle.

Figure 6:
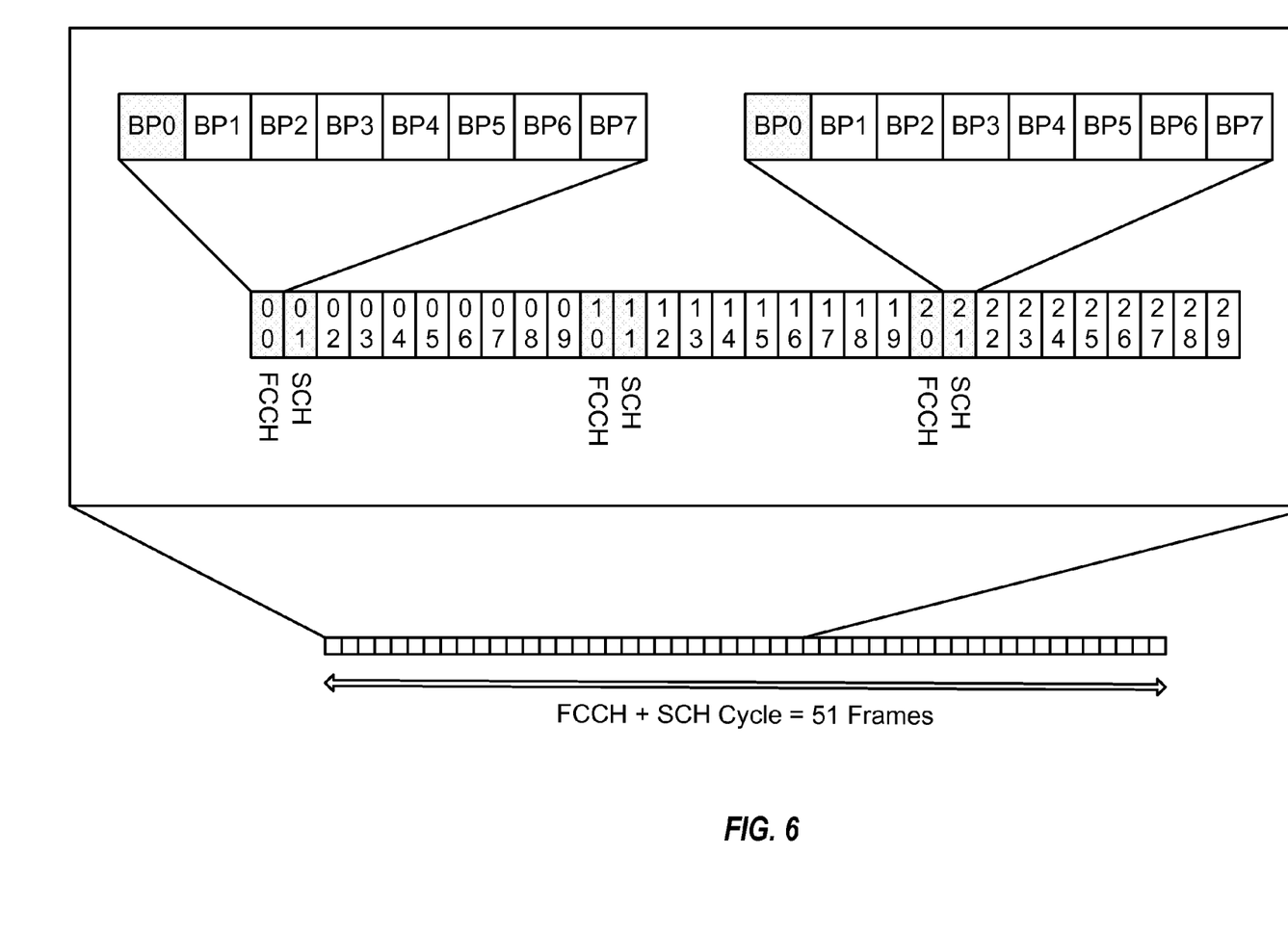
FIG. 6 is a block diagram illustrating a frame arrangement for measuring a global system for mobile communications (GSM) cell according to one aspect.

FIG. 6 shows a frame arrangement for measuring a Global System for Mobile Communications (GSM) cell according to one aspect. According to one aspect, for a UE to measure a GSM cell, the UE acquires a Frequency Correction Channel (FCCH) carrying a frequency pilot and a Synchronization Channel (SCH) carrying a Base Station Identity Code (BSIC). As shown in FIG. 6 a FCCH/SCH cycle in a GSM network has a duration of 51 frames. Each of the 51 frames in the cycle includes 8 Burst Periods (BPs). The FCCH is transmitted in the first BP (BP0) of Frame 0, 10, 20, 30, 40, and 50. The SCH is transmitted in the first BP of Frame 1, 11, 21, 31, and 41. According to one aspect, each BP is 15/26 milliseconds and 1 frame is 120/26 milliseconds. As shown in FIG. 6, the inter-FCCH/SCH period is ten frames (e.g., 46.15 milliseconds) or 11 frames (51.77 milliseconds).

To measure a GSM cell, the UE may acquire the FCCH in one frame of the FCCH/SCH cycle and acquire the SCH to read the BSIC. Detecting the FCCH and SCH of a GSM cell may take the UE a long time, for example, up to 11 GSM frames (e.g., 51.77 milliseconds). Because as few as two to three continuous TD-SCDMA time slots may available. Thus, the UE may not have enough time to complete acquisition of the GSM cell while in continuous communication with a TD-SCDMA serving cell.

According to one aspect, Control Channel DRX may be used for providing adequate time to a UE attached to a TD-SCDMA cell for acquiring a GSM cell and performing measurements to facilitate a handover in HSPA.

Figure 7:
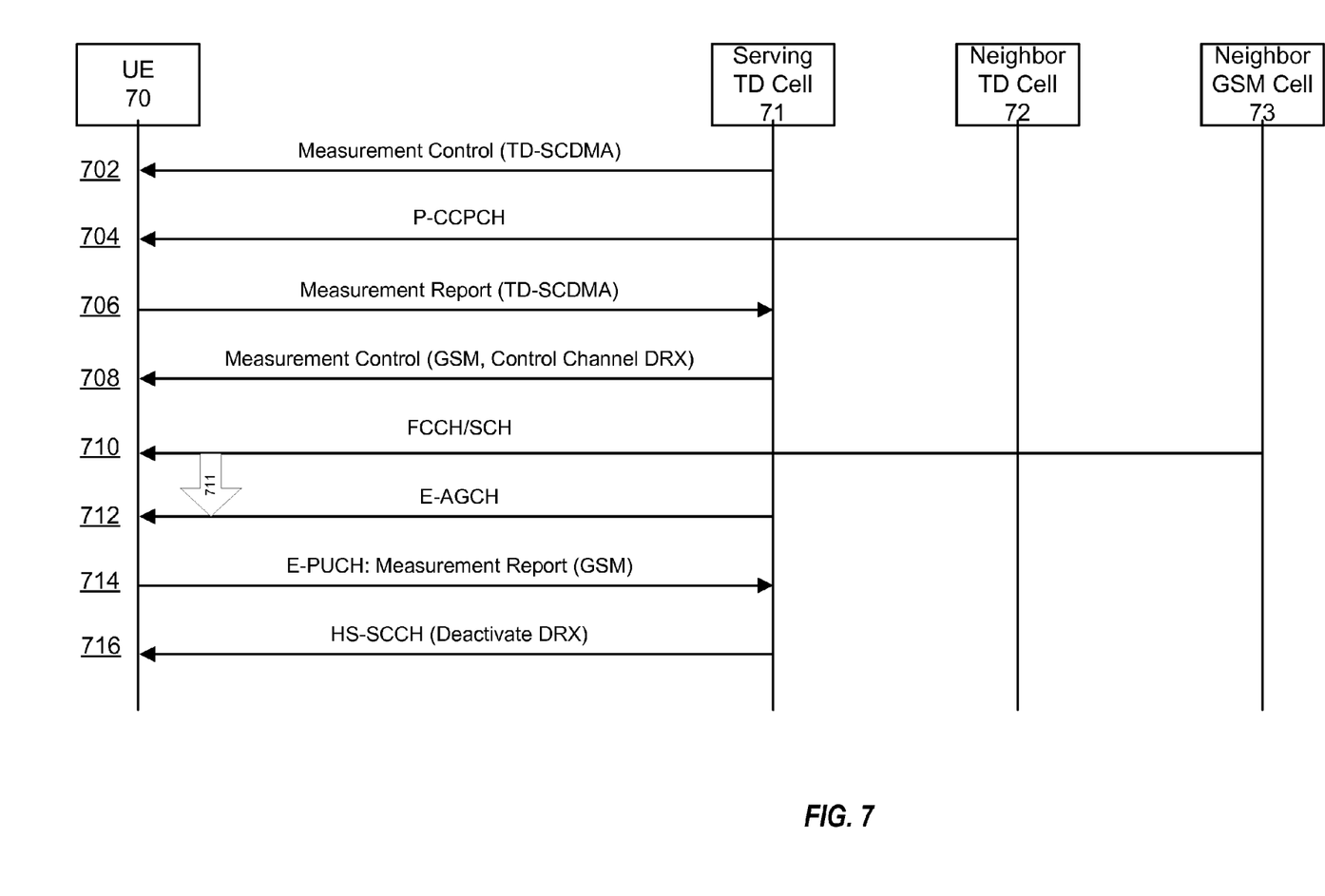
FIG. 7 is a call flow diagram for facilitating UE handover from a TD-SCDMA cell to a GSM cell according to one aspect.

FIG. 7 is a call flow diagram for facilitating UE handover from a TD-SCDMA cell to a GSM cell according to one aspect. In this embodiment, the Control Channel DRX reduces the GSM cell measurement time.

At time 702 the Node B of the TD-SCDMA serving cell 71 configures the UE 70 to measure at least one neighboring TD-SCDMA cell signal. At time 704 the UE 70 performs the indicated measurements by, for example, measuring a Receive Signal Code Power (RSCP) and/or a Reference Signal Received Quality (RSRQ) of a neighboring cell's Primary Common Control Physical Channel (P-CCPCH). At time 706, the UE 70 reports the measured signal strength for the neighboring TD-SCDMA cell 72 to the Node B of the TD-SCDMA serving cell 71.

If the Node B of the TD-SCDMA serving cell 71 determines the UE 70 is receiving unsatisfactory signal strength from the TD-SCDMA serving cell 71 and the neighboring TD-SCDMA cell 72, then at time 708 the serving cell Node B 71 may instruct the UE 70 to measure a neighboring GSM cell signal strength. According to one aspect, the measurement control indicator to the UE 70 indicates to the UE 70 to enter a Control Channel DRX mode and indicates to the UE 70 to perform measurement of the GSM cell 73. A single measurement control indicator may include two commands. According to another aspect, the Node B 71 sends two indicators to the UE 70. The first indicator may be a measurement control message instructing the UE 70 to measure the GSM cell 73. The second indicator may be a radio bearer reconfiguration message, or similar message, instructing the UE 70 to enter the Control Channel DRX mode.

According to one aspect, the Control Channel DRX message is configured such that the HS-SCCH/E-AGCH DRX Cycle is large enough for the UE 70 to perform measurement of the GSM cell 73 in at least one inter-FCCH/SCH period. For example, the HS-SCCH/E-AGCH DRX Cycle may be at least 11 TD-SCDMA subframes (e.g., 55 milliseconds). The Control Channel DRX may also be configured with an HS-SCCH/E-AGCH DRX Offset such that the UE quickly starts the DRX cycle. In addition, the inactivity threshold may be set to one or a few subframes to allow the UE 70 to quickly start the DRX mode, allowing sufficient time for measurement of the GSM cell 73. After time 708, the Node B of the serving cell 71 does not allocate downlink or uplink bandwidth to the UE 70 before the DRX Offset.

At time 710 the UE 70 starts Control Channel DRX (for the DRX cycle 711) and performs GSM cell measurement. After the Control Channel DRX period 711 begins, the UE 70 may tune to the GSM cell 73 and perform measurement by acquiring the FCCH and SCH, as described above with reference to FIG. 6.

When the time to monitor the HS-SCCH and E-AGCH arrives, the UE 70 returns to the TD-SCDMA network, at time 712. The Node B of the serving cell 71 then allocates uplink bandwidth for the UE 70 on the E-AGCH in the monitoring subframe. The uplink bandwidth allows the UE 70 to transmit a measurement report of the GSM cell 73. At time 714, the UE 70 transmits a measurement report of the GSM cell 73 to the Node B of the TD-SCDMA serving cell 71, for example, over the Enhanced Dedicated Channel (E-DCH) Physical Uplink Channel (E-PUCH). In one embodiment, multiple measurements of the GSM cell 73 are taken, although FIG. 7 only depicts a single measurement.

The Node B of the serving cell 71, after receiving the measurement report(s) from the UE 70, decides whether to handover the UE 70 to the neighboring GSM cell 73. If the Node B of the serving cell 71 determines to handover the UE 70 to the neighboring GSM cell 73, the Node B of the TD-SCDMA serving cell 71 sends to the UE 70 a HS-SCCH deactivate command to disable Control Channel DRX on the UE 70, at time 716. If the Node B of the serving cell 71 does not receive a complete measurement report, the Node B of the serving cell 71 and the UE 70 continue with another Control Channel DRX cycle and the UE 70 can measure the GSM cell 73 again. In other words, the DRX cycles continue unless a deactivate command is received.

Figure 8:
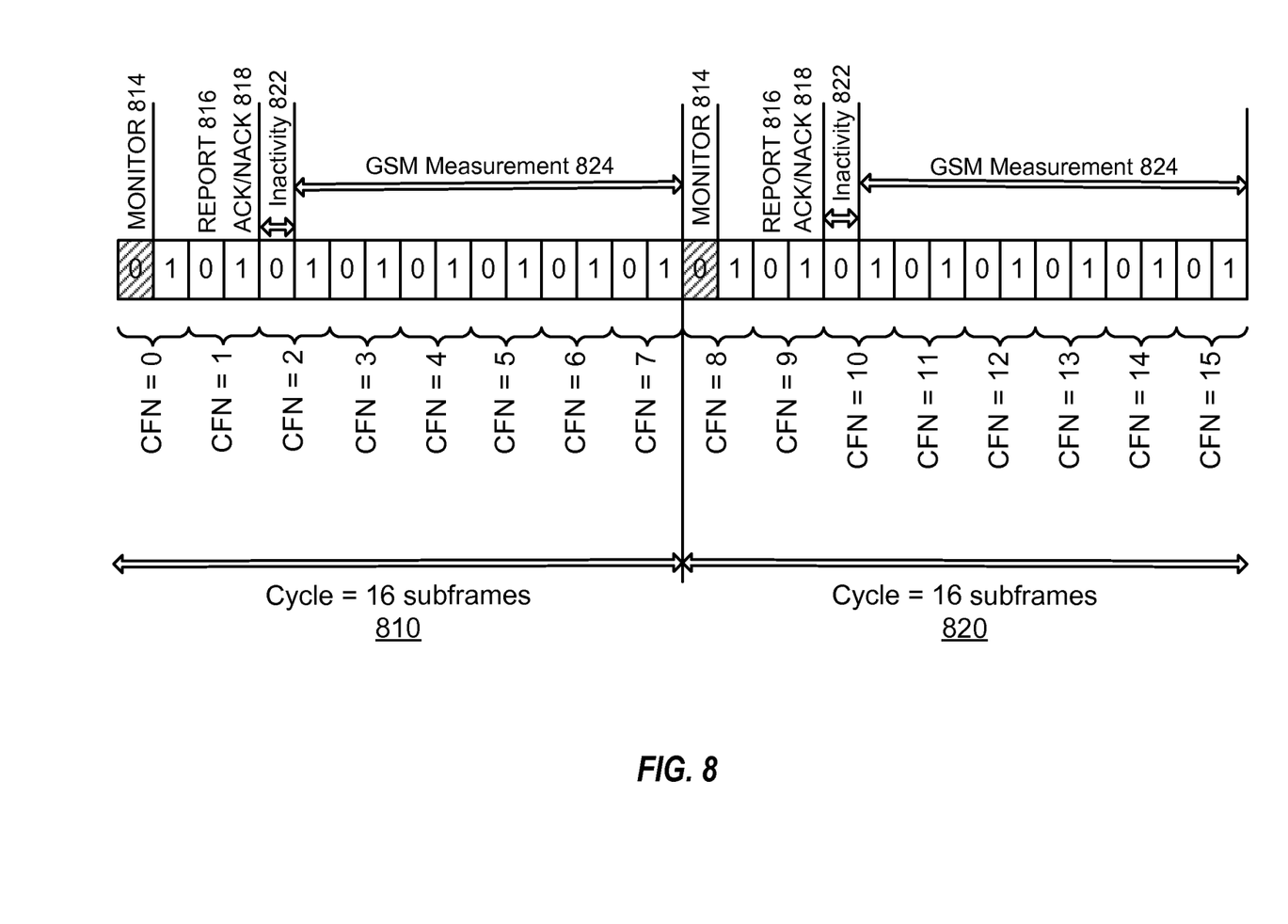
FIG. 8 is a block diagram illustrating an exemplary timing for monitoring physical channels on a first network and performing measurement of another network according to one aspect.

FIG. 8 is a block diagram illustrating an exemplary timing for monitoring physical channels on a first network and performing measurement of another network according to one aspect. In this example, each cycle 810, 820 is 16 subframes, the offset is 0, and the inactivity threshold 822 is one subframe.

During the physical channel monitoring 814 at CFN=0, subframe 1, some bandwidth is allocated via the E-AGCH for two subframes later, i.e., CFN=1, subframe 0. A measurement report 816 is sent at CFN=1, subframe 0. If a GSM measurement occurred in a prior cycle (not shown) the report 816 could reflect that measurement. Otherwise, the measurement report 816 may be for a cell other than the GSM cell. In another embodiment, no measurement report is sent at this time.

In case a report 816 is sent, after the ACK/NACK activity 818 on the E-HICH for the measurement report 816 at CFN=1, subframe 1, the inactivity period timer 822 starts, at CFN=2, subframe 0. In this example, the inactivity threshold 822 is one subframe, thus, the UE can tune away from the TD-SCDMA network and a GSM measurement 824 can occur starting at CFN=2, subframe 1. In this example, enough contiguous subframes are available to complete the GSM measurement 824 before returning to the TD-SCDMA network for physical channel monitoring 814 in the next cycle 820. The process repeats in the next cycle 820. In the next cycle 820, the measurement report 816 will be for the measurement 824 of the cycle 810.

Figure 9:
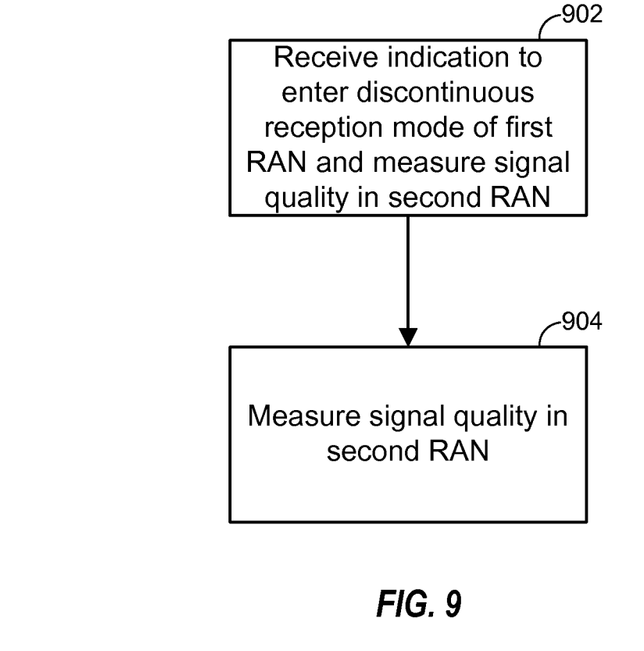
FIG. 9 is a flow chart for measuring a nearby different radio access network according to one aspect.

FIG. 9 is a flow chart for measuring a nearby cell of a different radio access technology, according to one aspect. At block 902 a UE receives an indication to enter a discontinuous reception (DRX) mode of a radio access network (RAN) of a first radio access technology (RAT) and measure signal quality in a radio access network of a second radio access technology. For example, the first radio access technology may be a TD-SCDMA network and the second radio access technology may be a GSM network, although the networks are not necessarily so limited. At block 904 the UE measures signal quality in the second radio access network while in a discontinuous reception mode with the first radio access network. If desired, handover between the different radio access networks may occur after the signal quality measurement.

Figure 10:
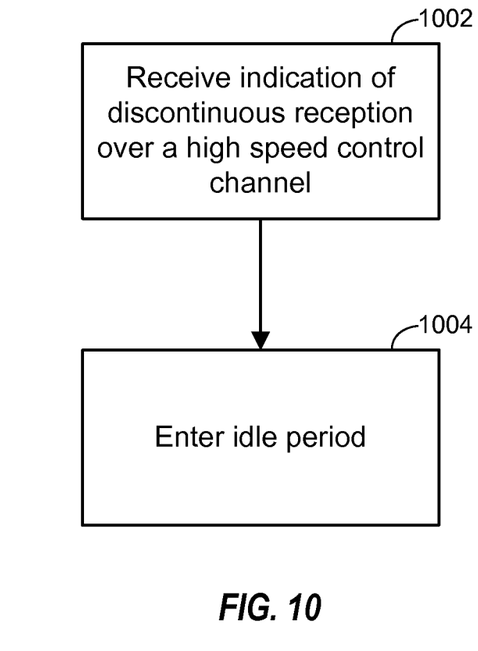
FIG. 10 is a flow chart for entering discontinuous reception according to one aspect.

FIG. 10 is a flow chart for entering discontinuous reception according to one aspect. At block 1002 a UE connected to a wireless network receives indication to enter a DRX mode over a high speed control channel. At block 1004 the UE enters an idle period during which no reception from the wireless network occurs.

The methods and systems described above improve GSM measurement time for multimode UE devices attached to a TD-SCDMA network. For example, a multimode UE may enter DRX with a serving TD-SCDMA cell and measure a nearby GSM cell. The UE reports the GSM cell measurements to the serving TD-SCDMA cell. The serving TD-SCDMA Node B may decide whether to handover the multimode UE to the GSM cell. Control Channel DRX for measurement improves handover latency performance for the multimode UE devices.

Several aspects of a telecommunications system has been presented with reference to TD-SCDMA and GSM systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, Digital Signal Processor (DSP), a Field-Programmable Gate Array (FPGA), a Programmable Logic Device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., Compact Disc (CD), Digital Versatile Disc (DVD)), a smart card, a flash memory device (e.g., card, stick, key drive), Random Access Memory (RAM), Read Only Memory (ROM), Programmable ROM (PROM), Erasable PROM (EPROM), Electrically Erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating in a wireless network, comprising:

receiving, an indication based at least in part on a measured signal quality of a serving cell in a first radio access network, from a Node B (NB) of the first radio access network, to enter an idle interval and to measure a signal quality in a second radio access network, the idle interval configured to be large enough to complete measurement of the second radio access network; and measuring, during the idle interval, the signal quality in the second radio access network.

2. The method of claim 1, wherein the first radio access network is a Time Division-Synchronous Code Division Multiple Access (TD-SCDMA) network and the second radio access network is a Global System for Mobile Communications (GSM) network.

3. The method of claim 1, further comprising transmitting the measured signal quality of the second radio access network to the NB.

4. The method of claim 1, wherein the idle interval is during a high speed transmission.

5. The method of claim 1, wherein receiving the indication comprises receiving a control channel indication.

6. The method of claim 5, wherein receiving the control channel indication comprises receiving a discontinuous reception indication.

7. A computer program product for communicating in a wireless network, the computer program product comprising:
a non-transitory computer-readable medium comprising:
code to receive, an indication based at least in part on a measured signal quality of a serving cell in a first radio access network, from a Node B (NB) of the first radio access network, to enter an idle interval and to measure a signal quality in a second radio access network, the idle interval configured to be large enough to complete measurement of the second radio access network; and
code to measure, during the idle interval, the signal quality in the second radio access network.

8. The computer program product of claim 7, wherein the first radio access network is a Time Division-Synchronous Code Division Multiple Access (TD-SCDMA) network and the second radio access network is a Global System for Mobile Communications (GSM) network.

9. The computer program product of claim 7, wherein the medium further comprises code to transmit the measured signal quality of the second radio access network to the NB.

10. The computer program product of claim 7, wherein the code to measure measures during a high speed transmission.

11. The computer program product of claim 7, wherein the code to receive the indication comprises code to receive a control channel indication.

12. The computer program product of claim 11, wherein the code to receive the control channel indication comprises code to receive a discontinuous reception indication.

13. An apparatus for communicating in a wireless network, the apparatus comprising:
at least one processor; and
a memory coupled to the at least one processor,
wherein the at least one processor is configured:
to receive, an indication based at least in part on a measured signal quality of a serving cell in a first radio access network, from a Node B (NB) of the first radio access network, to enter an idle interval and to measure a signal quality in a second radio access network, the idle interval configured to be large enough to complete measurement of the second radio access network; and
to measure, during the idle interval, the signal quality in the second radio access network.

14. The apparatus of claim 13, wherein the first radio access network is a Time Division-Synchronous Code Division Multiple Access (TD-SCDMA) network and the second radio access network is a Global System for Mobile Communications (GSM) network.

15. The apparatus of claim 13, wherein the at least one processor is further configured to transmit the measured signal quality of the second radio access network to the NB.

16. The apparatus of claim 13, wherein the at least one processor is configured to measure during a high speed transmission.

17. The apparatus of claim 13, wherein the at least one processor is configured to receive the indication over a control channel indication.

18. The apparatus of claim 17, wherein the at least one processor is configured to receive in the control channel indication a discontinuous reception indication.

19. An apparatus for communicating in a wireless network, the apparatus comprising:
means for receiving, an indication based at least in part on a measured signal quality of a serving cell in a first radio access network, from a Node B (NB) of a first radio access network, to enter an idle interval and to measure a signal quality in a second radio access network, the idle interval configured to be large enough to complete measurement of the second radio access network; and
means for measuring, during the idle interval, the signal quality in the second radio access network.

20. The apparatus of claim 19, wherein the first radio access network is a Time Division-Synchronous Code Division Multiple Access (TD-SCDMA) network and the second radio access network is a Global System for Mobile Communications (GSM) network.

21. The apparatus of claim 19, further comprising means for transmitting the measured signal quality of the second radio access network to the NB.

22. The apparatus of claim 19, wherein the idle interval is during a high speed transmission.

23. The apparatus of claim 19, wherein the receiving means receives a control channel indication.

24. The apparatus of claim 23, wherein the receiving means receives a discontinuous reception indication.

25. A method for communicating in a wireless network, comprising:
transmitting an indication based at least in part on a measured signal quality of a serving cell in a first radio access network to a user equipment (UE) for the UE to enter an idle interval and to measure a signal quality in a second radio access network, the idle interval configured to be large enough to complete measurement of the second radio access network; and
receiving the measured signal quality of the second radio access network.

26. The method of claim 25, further comprising:
requesting the UE to measure the signal quality of the serving cell and signal qualities of neighbor cells in the first radio access network; and
receiving the measured signal quality of the serving cell and the signal qualities of the neighbor cells.

27. The method of claim 26, wherein the indication is also based at least in part on the measured signal qualities of the neighbor cells in the first radio access network.

28. The method of claim 25, wherein transmitting the indication comprises transmitting a control channel indication.

29. The method of claim 28, wherein transmitting the control channel indication comprises transmitting a discontinuous reception (DRX) indication.

30. A computer program product for communicating in a wireless network, the computer program product comprising:
a non-transitory computer-readable medium comprising:
code to transmit an indication based at least in part on a measured signal quality of a serving cell in a first radio access network to a user equipment (UE) for the UE to enter an idle interval and to measure a signal quality in a second radio access network, the idle interval configured to be large enough to complete measurement of the second radio access network; and code to receive the measured signal quality of the second radio access network.

31. The computer program product of claim 30, wherein the non-transitory computer-readable medium further comprises:

code to request the UE to measure the signal quality of the serving cell and signal qualities of neighbor cells in the first radio access network; and code to receive the measured signal quality of the serving cell and the signal qualities of the neighbor cells.

32. The computer program product of claim 31, wherein the indication is also based at least in part on the measured signal qualities of the neighbor cells in the first radio access network.

33. The computer program product of claim 30, wherein the code to transmit the indication comprises code to transmit a control channel indication.

34. The computer program product of claim 33, wherein the code to transmit the control channel indication comprises code to transmit a discontinuous reception (DRX) indication.

35. An apparatus for communicating in a wireless network, the apparatus comprising:

at least one processor; and
a memory coupled to the at least one processor,
wherein the at least one processor is configured:

to transmit an indication based at least in part on a measured signal quality of a serving cell in a first radio access network to a user equipment (UE) for the UE to enter an idle interval and to measure a signal quality in a second radio access network, the idle interval configured to be large enough to complete measurement of the second radio access network; and to receive the measured signal quality of the second radio access network.

36. The apparatus of claim 35, wherein the at least one processor is further configured:

to request the UE to measure the signal quality of the serving cell and signal qualities of neighbor cells in the first radio access network; and to receive the measured signal quality of the serving cell and the signal qualities of the neighbor cells.

37. The apparatus of claim 36, wherein the indication is also based at least in part on the measured signal qualities of the neighbor cells in the first radio access network.

38. The apparatus of claim 35, wherein the at least one processor is configured to transmit the indication over a control channel indication.

39. The apparatus of claim 38, wherein the at least one processor is configured to transmit in the control channel indication a discontinuous reception (DRX) indication.

40. An apparatus for communicating in a wireless network, the apparatus comprising:

means for transmitting an indication based at least in part on a measured signal quality of a serving cell in a first radio access network to a user equipment (UE) for the UE to enter an idle interval and to measure a signal quality in a second radio access network, the idle interval configured to be large enough to complete measurement of the second radio access network; and means for receiving the measured signal quality of the second radio access network.

41. The apparatus of claim 40, further comprising:

means for requesting the UE to measure the signal quality of the serving cell and signal qualities of neighbor cells in the first radio access network; and means for receiving the measured signal quality of the serving cell and the signal qualities of the neighbor cells.

42. The apparatus of claim 41, wherein the indication is also based at least in part on the measured signal qualities of the neighbor cells in the first radio access network.

43. The apparatus of claim 40, wherein the transmitting means transmits a control channel indication.

44. The apparatus of claim 43, wherein the transmitting means transmits a discontinuous reception (DRX) indication.

\* \* \* \* \*